United States Patent
Lee et al.

(10) Patent No.: US 7,269,238 B2
(45) Date of Patent: Sep. 11, 2007

(54) RECEIVING METHOD AND RECEIVER

(75) Inventors: Kuo Hsun Lee, Arlington, TX (US);
Sathiaseelan Sundaralingam, Camberley (GB); Gilles Charbit, Epsom (GB); Mikko Säily, Oulu (FI)

(73) Assignee: Nokia Corporation, Espoo (FI)

( * ) Notice: Subject to any disclaimer, the term of this patent is extended or adjusted under 35 U.S.C. 154(b) by 750 days.

(21) Appl. No.: 10/662,826

(22) Filed: Sep. 16, 2003

(65) Prior Publication Data
US 2005/0101279 A1   May 12, 2005

(30) Foreign Application Priority Data
Sep. 23, 2002   (GB) ................. 0222046.5

(51) Int. Cl.
*H03D 1/04* (2006.01)
*H04B 1/06* (2006.01)

(52) U.S. Cl. ............ 375/346; 375/347; 455/278.1

(58) Field of Classification Search ........ 375/346, 375/347; 455/278.1
See application file for complete search history.

(56) References Cited

U.S. PATENT DOCUMENTS 6,128,355 A * 10/2000 Backman et al. ........ 375/347
6,167,039 A * 12/2000 Karlsson et al. ........ 370/342
6,215,814 B1 * 4/2001 Ylitalo et al. ........ 375/148
2004/0114695 A1 * 6/2004 Astely et al. ........ 375/343
2005/0111596 A1 * 5/2005 Olsson et al. ........ 375/346

OTHER PUBLICATIONS

Asztely et al, "MLSE and Spatio-Temporal Interference Rejection Combining with Antenna Arrays," in Proceedings of the EUSIPCO98, Rhodos, Greece, Sep. 1998.*

* cited by examiner

*Primary Examiner*—Temesghen Ghebretinsae
(74) *Attorney, Agent, or Firm*—Squire, Sanders & Dempsey L.L.P.

(57) ABSTRACT

The invention relates to a receiver and a receiving method in a receiver of a radio system. The method comprises: receiving (500) signal with an array antenna comprising at least two antenna elements, oversampling (504) the received signal, measuring (900) the spatial and temporal colour of the received oversampled signal, combining (9089 the received signal with combined maximum ratio combining and space-time interference rejection combining, controlling (902-904) the combining of the received signal on the basis of the measurement result.

21 Claims, 8 Drawing Sheets

RECEIVING METHOD AND RECEIVER

FIELD

The invention relates to a method of receiving of a signal using an antenna array comprising more than one antenna elements and a receiver.

BACKGROUND

In radio systems, where information is transferred on a radio path, the desired signal is impaired by interference caused by other users or systems and noise which sum into the signal. Therefore, radio systems employ different diversity methods to increase the coverage area and/or capacity of the system. One of them is spatial diversity, which is obtained using an array antenna comprising a plural number of antenna elements that are physically separate from each other. The received signals are combined in diversity receivers using a suitable combining method.

The task of combining is thus to combine signal components received with different antenna elements and to minimise the effect of noise and interference on the desired signal. Current receivers are based on statistical signal models the accuracy of which cannot be relied on in all situations. A known combining method, which can reduce the impact of noise and interference, is Maximal Ratio Combining (MRC) method. However, this method supposes that the interference and noise in each antenna element are independent of other antenna elements, i.e. they are white. This is not always true in actual cellular radio networks, in particular. For example, in many cases even only a few high-power signals may cause interference upon reception that affects all the antenna elements, i.e. the interference in the antenna elements is coloured. Another known combining method is Interference Rejection Combining (IRC). IRC does not contain assumptions about whether interference and noise correlate with antenna elements. However, neither of these known methods has optimal interference rejection performance.

A proposed improvement is Space Time Interference Rejection Combining (STIRC). In this method, the received signal is oversampled, i.e. more than one sample is taken from each received symbol. It has been shown that the interference rejection capability of STIRC is 10 to 20 dB better than the capability of an equivalent MRC method. However, one problem with STIRC is that there can be significant amount of loss when the system is tested in noise-limited environments using weak channel codes. Compared with MRC, the STIRC algorithm may show 0.5-1 dB degradation in sensitivity simulations.

Receiver sensitivity is a key performance criterion in network planning. Good base station sensitivity can allow lower mobile station transmission power, thereby reducing overall interference, allowing better mobile station battery life, and hence lowering the number of sub-cells in coverage limited rural areas. However, increasing capacity by deploying smaller cells may increase co/adjacent channel interference. Therefore, one of the issues in finding a combiner solution is to obtain an algorithm that maintains the existing sensitivity performance but does not significantly affects the interference performance.

Figure 1:
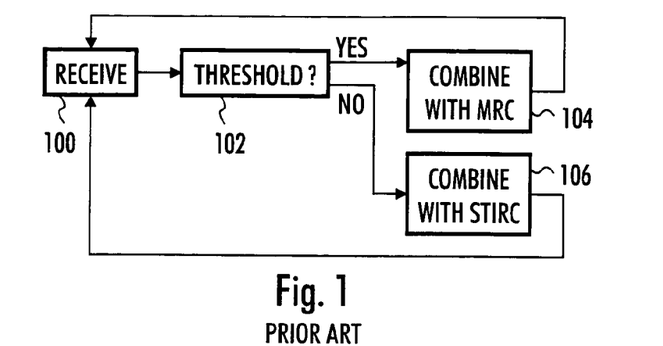
FIG. 1 shows an already described prior art combination arrangement.

There have been proposals which combine MRC and STIRC methods. A suggested mechanism shown in FIG. 1, is to switch between MRC and STIRC according to measured noise co-variance and variance terms. Signals are received and noise co-variance and variance terms are measured and estimated in block 100. In block 102, decision on the combining method to be used is made. On the basis of the decision, received signals are forwarded to respective combining unit 104 or 106. This solution provides a hard switch between two algorithms and may provide give a reasonable solution provided that there is no overlap in the noise- and interference-limited regions on the used decision boundary. In practice, considering all channel conditions, obtaining an optimum decision boundary is a difficult task, which in turn causes significant interference removal loss. For example, it has been shown that the above solution where the best decision boundary is optimised against all possible channel conditions provides 3-5 dB interference losses while focusing the sensitivity gain closer to MRC. Thus, almost half of the STIRC interference gain is lost due to the extra complexity of the two different combiners.

BRIEF DESCRIPTIONS OF THE INVENTION

It is an object of the invention to provide a receiving method with good interference rejection properties and sensitivity. According to an aspect of the invention, there is provided a receiving method in a receiver of a radio system, comprising: receiving a signal with an array antenna comprising at least two antenna elements, oversampling the received signal, measuring the spatial and temporal colour of the received signal samples, combining the received signal using combined maximum ratio combining and space-time interference rejection combining, controlling the combining of the received signal on the basis of the measurement result.

According to an aspect of the invention, there is also provided a receiver comprising an array antenna for signal reception, the array antenna comprising at least two antenna elements, the receiver further comprising means for oversampling the received signal, means for measuring the spatial and temporal colour of the samples, means for combining the received signal using combined maximum ratio combining and space-time interference rejection combining, and means for controlling the combining of the received signal on the basis of the measurement result.

Different embodiments of the invention provide several advantages. In an embodiment of the invention, a decision boundary is formed based on a threshold that will detect a region with severe interference. In a preferred embodiment of the invention the energy of noise and the cross-correlation of noise between samples of the received signals are calculated. A threshold value is determined as a quotient of the above values. The combining is then controlled on the basis of the threshold value.

In an embodiment of the invention, the calculated threshold is compared with a predetermined threshold boundary, and if the threshold value exceeds the given pre-determined value, a scaling factor is calculated on the basis of the threshold value. The combining of the received signal is then controlled on the basis of the scaling factor.

In an embodiment of the invention, if the threshold value is below the given pre-determined value, the combining process is IRC, whereas if the given pre-determined value is exceeded, MRC elements are gradually introduced to the combining process by scaling down the IRC elements in a correlation matrix used in the process. Thus the combining method is an adaptive combination of these two methods.

LIST OF DRAWINGS

In the following, the invention will be described in greater detail with reference to the preferred embodiments and the accompanying drawings, in which.

DESCRIPTION OF THE EMBODIMENTS

Figure 2:
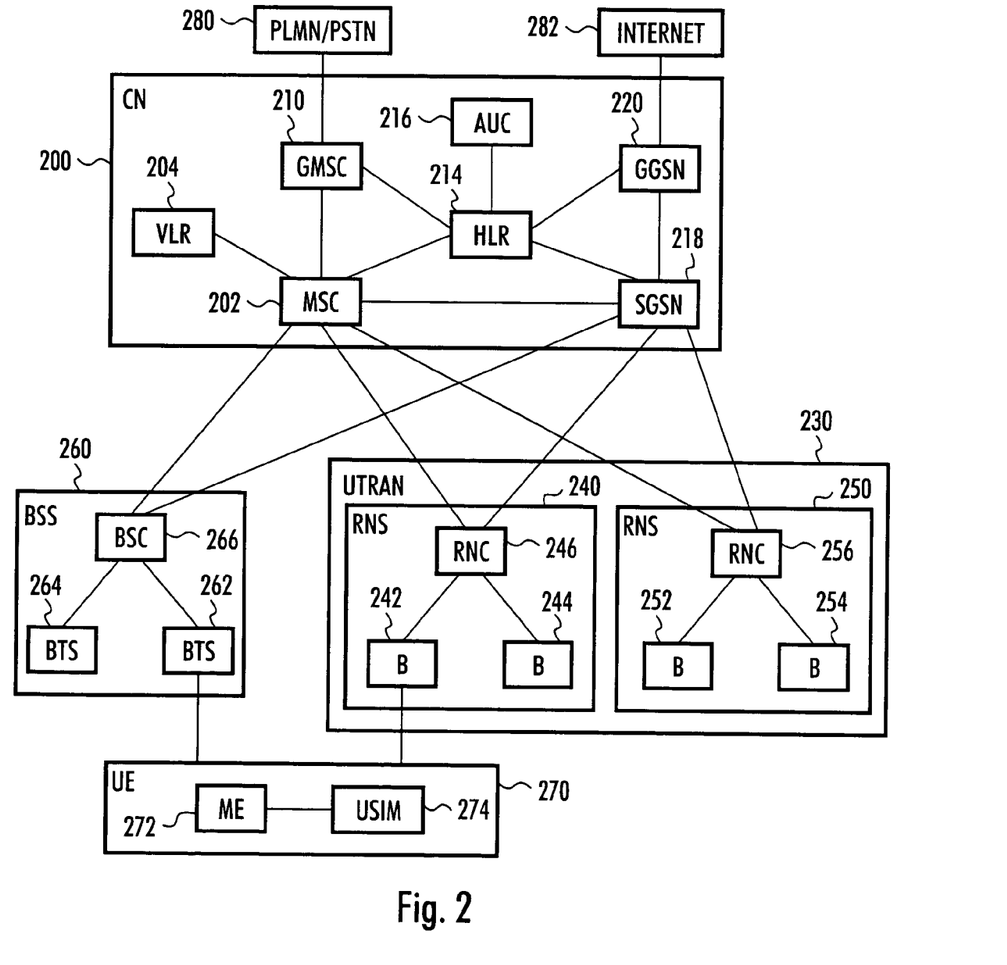
FIG. 2 shows an example of a data transmission system.

With reference to FIG. 2, examine an example of a data transmission system in which the preferred embodiments of the invention can be applied. FIG. 2 is a simplified block diagram that describes on network element level the most important parts of the radio systems. The structure and functions of the network elements are not described in detail, because they are commonly known. The described solution may be applied in digital TDMA, FDMA and CDMA radio systems, although it is not restricted to them.

In FIG. 2, a core network CN 200 represents the radio-independent layer of the telecommunications system. The radio systems are shown as a first radio system, i.e. radio access network 230, and a second radio system, i.e. base station system BSS 260. In addition, the Figure shows user equipment UE 270. The term UTRAN comes from the words UMTS Terrestrial Radio Access Network, i.e. the radio access network 230 is implemented using wideband code division multiple access WCDMA. The base station system 260 is implemented using time division multiple access TDMA.

Generally, it is also possible to define that a radio system comprises user equipment, also known as a user device or a mobile phone, and a network part that contains the radio access network or base station system of the fixed infrastructure of the radio system.

The structure of the core network 200 corresponds to a combined GSM and GPRS system structure. The GSM network elements are responsible for providing circuit-switched connections and the GPRS network elements are responsible for providing packet-switched connections, some of he network elements being, however, included in both systems.

A mobile services switching centre MSC 202 is the midpoint of the circuit-switched side of the core network 200. One and the same mobile services switching centre 202 can be used to serve the connections of both the radio access network 230 and the base station system 260. The tasks of the mobile services switching centre 202 include switching, paging, location registration, handover management, collecting subscriber billing information, encryption parameter management, frequency allocation management, and echo cancellation. The number of mobile services switching centres 202 may vary: a small network operator may have only one mobile services switching centre 202, but large core networks 200 usually have several.

Large core networks 200 can have a separate gateway mobile services switching centre GMSC 210 that takes care of the circuit-switched connections between the core network 200 and external networks 280. The gateway mobile services switching centre 210 is located between the mobile services switching centres 202 and the external networks 280. An external network 280 can be a public land mobile network PLMN or public switched telephone network PSTN, for instance.

A home location register HLR 214 contains a permanent subscriber register, i.e. the following information, for instance: an international mobile subscriber identity IMSI, mobile subscriber ISDN number MSISDN, authentication key, and when the radio system supports GPRS, a PDP (Packet Data Protocol) address.

A visitor location register VLR 204 contains user equipment 270 roaming information in the area of the mobile services switching centre 202. The visitor location register 204 contains mainly the same information as the home location register 214, but the information is only temporarily in the visitor location register 204.

An authentication centre AuC 216 always resides physically at the same location as the home location register 214 and contains an individual subscriber authentication key Ki, ciphering key CK and the corresponding IMSI.

The network elements in FIG. 2 are functional entities whose physical implementation may vary. Ordinarily, the mobile services switching centre 202 and visitor location register 204 form one physical device, and the home location register 214 and authentication centre 216 another physical device.

A serving GPRS support node SGSN 218 is the midpoint of the packet-switched side of the core network 200. The main task of SGSN 218 is to transmit packets to and receive them from user equipment 270 supporting packet-switched transmission by using the radio access network 230 or base station system 260. SGSN 218 contains subscriber and location information concerning the user equipment 270.

A gateway GPRS Support Node GGSN 220 is the packet-switched side counterpart to the gateway mobile services switching centre 210 of the circuit-switched side, with the difference, however, that GGSN 220 must also be capable of routing traffic from the core network 200 to external networks 282, whereas GMSC 210 only routes incoming traffic. In our example, the Internet represents the external networks 282.

The first radio system, i.e. radio access network 230, comprises radio network subsystems RNS 240, 250. Each radio network subsystem 240, 250 comprises radio network controllers RNC 246, 256 and Nodes B 242, 244, 252, 254. The Node B is a rather abstract concept, and often the term base station is used instead of it.

The radio network controller 246 controls the Nodes B 242, 244. In principle, the aim is that the devices providing the radio path and the related functions reside in the Nodes B 242, 244 and the control devices reside in the radio network controller 246.

The radio network controller 246 takes care of the following tasks, for instance: radio resource management of the Node B 242, 244, intercell handovers, frequency management, i.e. the allocation of frequencies to the Nodes B 242, 244, management of frequency hopping sequences, measurement of time delays on the uplink, provision of the operation and maintenance interface, and power control.

The Node B 242, 244 comprises one or more transceivers, with which the WDCMA radio interface is provided. The Node B serves one cell, but it can also serve several sectored cells. The diameter of a cell may vary from a few metres to dozens of kilometres. The tasks of the Node B 242, 244 include: timing advance calculation, uplink measurements, channel coding, encryption and decryption.

The second radio system, i.e. base station system 260, comprises a base station controller BSC 266 and base stations BTS 262, 264. The base station controller 266 controls the base stations 262, 264. In principle, the aim is that the devices providing the radio path and the related functions reside in the base stations 262, 264 and the control devices reside in the base station controller 266. The base station controller 266 takes care of essentially the same tasks as the radio network controller.

The base station 262, 264 contains at least one transceiver that provides one carrier, i.e. eight time slots, i.e. eight physical channels. Typically, one base station 262, 264 serves one cell, but it can also serve several sectored cells. The base station 262, 264 also comprises a transcoder that converts between the speech coding formats used in the radio system and the public telephone network. However, in practice, the transcoder usually resides physically in the mobile services switching centre 202. The tasks of the base station 262, 264 correspond to those of the Node B.

Both Node B 242, 244 and base station 262, 264 may utilise spatial diversity, i.e. use an array antenna in the signal reception (and also transmission). An antenna array may comprise a plural number of antenna elements that are physically separate from each other. The received signals are combined in diversity receivers using a suitable combining method.

The user equipment 270 comprises two parts: mobile equipment ME 272 and UMTS subscriber identity module USIM 274. The user equipment 270 contains at least one transceiver that provides a radio link to the radio access network 230 or base station system 260. The user equipment 270 may contain at least two different user identity modules. In addition, the user equipment 270 contains an antenna, user interface and a battery. Currently, there are different types of user equipment 270, those installed in cars and portable equipment, for instance.

USIM 274 contains user-related information and especially information related to information security, such as an encryption algorithm.

Figure 3:
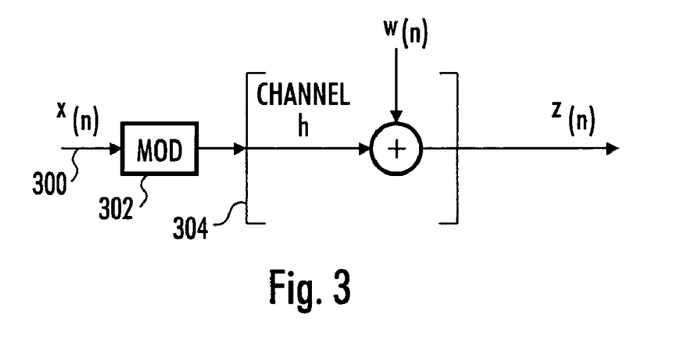
FIG. 3 illustrates a signal model in a non-diversity case.

Let us next examine the theoretical basis of the disclosed solution. A signal model in a single branch case (i.e. no spatial diversity) is illustrated in FIG. 3. Symbols to be transmitted 300 are modulated in a modulator 302 and transmitted through a channel 304 with impulse response h. In the channel noise w is added to the signal. Received base band signal z is thus $$z(n) = x * h(n) + w(n),$$

where h is channel impulse response and w additive noise. This formula can be rewritten using matrix notation as $$z = Xh + w.$$

Applying this to a spatial diversity case, where two antenna branches are used, namely main and diversity branches, and assuming that the received signal is oversampled (two samples per symbol), we get the following:

$$(z_{M1}, z_{M2}) \ (z_{D1}, z_{D2})$$

$$z_{M1} = Xh_{M1} + w_{M1} \quad z_{D1} = Xh_{D1} + w_{D1}$$

$$z_{M2} = Xh_{M2} + w_{M2} \quad z_{D2} = Xh_{D1} + w_{D2} \tag{1}$$

where indices M and D indicate the main and diversity branches, and indices 1 and 2 denote a first and a second sample of a symbol, respectively.

Figure 4:
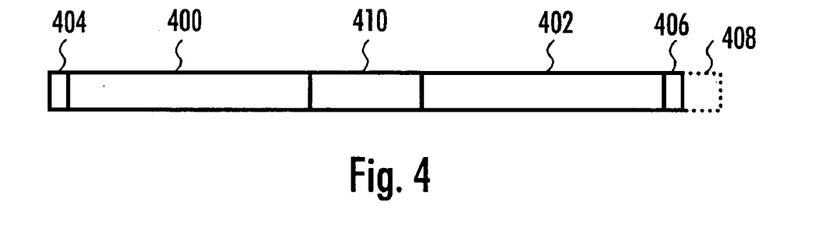
FIG. 4 illustrates a typical burst used in radio systems.

An example of a typical burst used in radio systems is illustrated in FIG. 4. The burst comprises actual encrypted data fields 400, 402, tail symbols 404, 406 at the beginning and the end of the burst, guard period symbols 408 and a training sequence 410, typically in the middle of the burst. Training symbols are known symbols, which are used in channel estimation. Error vectors $e_{M1}, e_{M2}, e_{D1}, e_{D2}$ for each diversity branch and sample can be formed over the training sequence symbols as $$e_M = (e_{M1}, e_{M2}) \ e_D = (e_{D1}, e_{D2})$$

$$e_{M1} = z_{M1} - Xh_{M1} \quad e_{D1} = z_{D1} - Xh_{D1},$$

$$e_{M2} = z_{M2} - Xh_{M2} \quad e_{D2} = z_{D2} - Xh_{D2} \tag{2}$$

where z denotes the training sequence symbols.

Here it is assumed, that the interference and noise in each antenna element is not dependent on other antenna elements, i.e. they are coloured. The correlation of noise and interference is estimated using covariance matrices.

Next, spatial noise co-variance matrices are determined. These matrices are needed for IRC spatial whitening, i.e. removal of correlation in the space domain. The spatial noise co-variance matrices $A_1$ and $A_2$ are determined independently for first and second samples as $$A_1 = \begin{pmatrix} E\{e_{M1}e_{M1}^H\} & E\{e_{M1}e_{D1}^H\} \\ E\{e_{D1}e_{M1}^H\} & E\{e_{D1}e_{D1}^H\} \end{pmatrix} = \begin{pmatrix} \sigma_{M1}^2 & \text{cov}_{12} \\ \text{cov}_{21} & \sigma_{M2}^2 \end{pmatrix} \tag{3}$$

$$A_2 = \begin{pmatrix} E\{e_{M2}e_{M2}^H\} & E\{e_{M2}e_{D2}^H\} \\ E\{e_{D2}e_{M2}^H\} & E\{e_{D2}e_{D2}^H\} \end{pmatrix} = \begin{pmatrix} \sigma_{M2}^2 & \text{cov}_{34} \\ \text{cov}_{43} & \sigma_{D2}^2 \end{pmatrix} \tag{4}$$

Here $E\{e_{M1}, e_{M2}\}$ denotes the expectation value of product $e_{M1} \ e_{M2}$ and $e_{M1}^H$ denotes a Hermitian vector of a complex vector $e_{M1}$. $\sigma_{M1}$ represents noise variance of a respective branch and sample, and $\text{cov}_{ij}$ represents the covariance between branches i and j. Although there are only two antenna branches, oversampling creates two additional "branches", thus making the number of branches four.

Next, temporal noise co-variance matrices are defined. These matrices are needed for temporal whitening in IRC i.e. removal of correlation in the time domain. These matrices are computed typically after the spatial whitening. The temporal noise co-variance matrices CM and CD are determined independently for main and diversity branches, respectively, as $$C_M = \begin{pmatrix} E\{e_{M1}e_{M1}^H\} & E\{e_{M1}e_{M2}^H\} \\ E\{e_{M2}e_{M1}^H\} & E\{e_{M2}e_{M2}^H\} \end{pmatrix} = \begin{pmatrix} \sigma_{M1}^2 & \text{cov}_{13} \\ \text{cov}_{31} & \sigma_{M2}^2 \end{pmatrix} \tag{5}$$

$$C_D = \begin{pmatrix} E\{e_{D1}e_{D1}^H\} & E\{e_{D1}e_{D2}^H\} \\ E\{e_{D2}e_{D1}^H\} & E\{e_{D2}e_{D2}^H\} \end{pmatrix} = \begin{pmatrix} \sigma_{D1}^2 & \text{cov}_{24} \\ \text{cov}_{42} & \sigma_{D2}^2 \end{pmatrix} \tag{6}$$

Only variance and co-variance terms for the diversity branch need to be recomputed. The variance and co-variance terms for the main branch were already calculated for spatial whitening, and they do not need recomputing because the spatial whitening only affected the diversity branch signal and channel taps.

Next, spatial and temporal noise co-variance matrix is defined. This 4×4 matrix is needed for space-time IRC spatial whitening. It is determined as $$N = \begin{pmatrix} E\{e_{M1}e_{M1}^H\} & E\{e_{M1}e_{D1}^H\} & E\{e_{M1}e_{M2}^H\} & E\{e_{M1}e_{D2}^H\} \\ E\{e_{D1}e_{M1}^H\} & E\{e_{D1}e_{D1}^H\} & E\{e_{D1}e_{M2}^H\} & E\{e_{D1}e_{D2}^H\} \\ E\{e_{M2}e_{M1}^H\} & E\{e_{M2}e_{D1}^H\} & E\{e_{M2}e_{M2}^H\} & E\{e_{M2}e_{D2}^H\} \\ E\{e_{D2}e_{M1}^H\} & E\{e_{D2}e_{D1}^H\} & E\{e_{D2}e_{M2}^H\} & E\{e_{D2}e_{D2}^H\} \end{pmatrix} \tag{7}$$

$$= \begin{pmatrix} \sigma_{11}^2 & \text{cov}_{12} & \text{cov}_{13} & \text{cov}_{14} \\ \text{cov}_{21} & \sigma_{22}^2 & \text{cov}_{23} & \text{cov}_{24} \\ \text{cov}_{31} & \text{cov}_{32} & \sigma_{33}^2 & \text{cov}_{34} \\ \text{cov}_{41} & \text{cov}_{42} & \text{cov}_{43} & \sigma_{44}^2 \end{pmatrix}$$

Let us study the combination of Space Time Interference Rejection Combining (STIRC) and Maximum Ratio Combining (MRC). Consider a system where no temporal whitening is performed. This is typical for oversampled systems. Instead, spatial diversity terms from different antenna elements are whitened and combined. In a basic form, the noise covariance matrix N for two antennas can be expanded to a block matrix shown in equation 8, where the first matrix presents the noise variance terms (i.e. MRC) and the second matrix presents the co-variance terms (i.e. IRC).

$$N = \begin{pmatrix} \sigma_{11}^2 & cov_{12} \\ cov_{21} & \sigma_{22}^2 \end{pmatrix} = \begin{pmatrix} \sigma_{11}^2 & 0 \\ 0 & \sigma_{22}^2 \end{pmatrix} + \begin{pmatrix} 0 & cov_{12} \\ cov_{21} & 0 \end{pmatrix} \quad (8)$$

It is possible to completely suppress the co-variance matrix distribution from the joint MRC-IRC combining process by using a scaling factor $\alpha$ as shown in equation 9.

$$\hat{N} = \begin{pmatrix} \sigma_{11}^2 & 0 \\ 0 & \sigma_{22}^2 \end{pmatrix} + \alpha \begin{pmatrix} 0 & cov_{12} \\ cov_{21} & 0 \end{pmatrix} = \begin{pmatrix} \sigma_{11}^2 & \alpha cov_{12} \\ \alpha cov_{21} & \sigma_{22}^2 \end{pmatrix}. \quad (9)$$

Thus, with the use of the scaling factor the properties of the combining process can be controlled adaptively. According to a preferred embodiment the value for the scaling factor is between 0 and 1. As the value varies between these values, the properties of the combining process vary from full MRC to full IRC, covering all the combination possibilities between these extremes.

It is possible to apply the above described scaling factor method also when more than two antennas are used. In that case correlation properties may vary between antenna array elements. The variation in correlation between antennas may be due to, for example, the radio channel, physical properties of random elements or the direction of arrival (DOA) of a radio signal. It is known that dual polarized antennas have different correlation properties between slanted elements (for example horizontal, vertical or +/−45 degrees slanted elements) if the DOA varies or the mobile is located away from antenna boresight. In one preferred embodiment several scaling factors are estimated. Equation 10 is a block matrix presentation of a joint MRC-IRC system for three antennas.

$$\hat{N} = \begin{pmatrix} \sigma_{11}^2 & 0 & 0 \\ 0 & \sigma_{22}^2 & 0 \\ 0 & 0 & \sigma_{33}^2 \end{pmatrix} + \alpha_1 \begin{pmatrix} 0 & cov_{12} & 0 \\ cov_{21} & 0 & 0 \\ 0 & 0 & 0 \end{pmatrix} + \alpha_2 \begin{pmatrix} 0 & 0 & cov_{13} \\ 0 & 0 & 0 \\ cov_{31} & 0 & 0 \end{pmatrix} + \alpha_3 \begin{pmatrix} 0 & 0 & 0 \\ 0 & 0 & cov_{23} \\ 0 & cov_{32} & 0 \end{pmatrix}. \quad (10)$$

In this embodiment one scaling factor applies only to one selected pair of antennas. When a pair of antennas is selected and decorrelated, a specific scaling factor is calculated.

Figure 5:
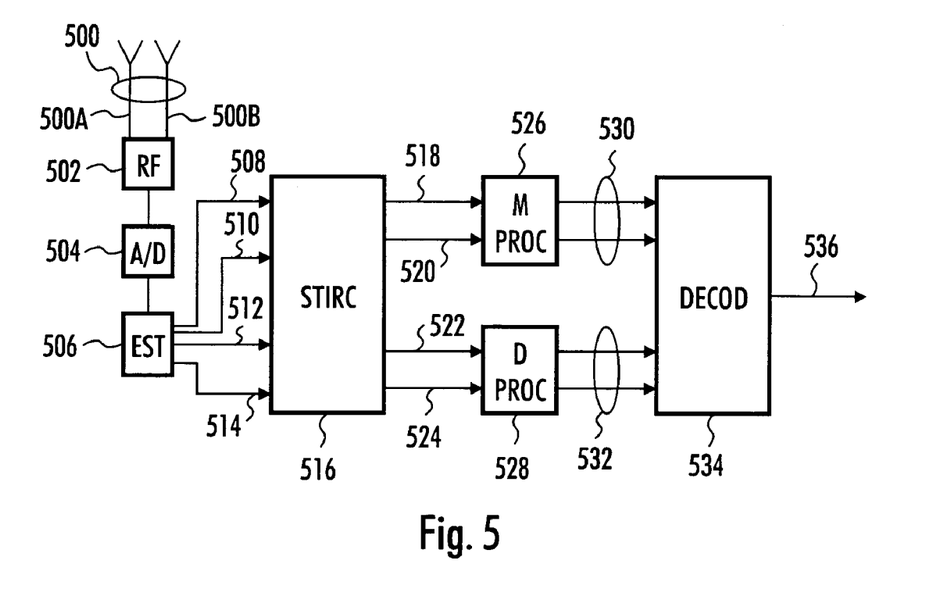
FIG. 5 illustrates an example of the structure of a diversity receiver employing STIRC.

FIG. 5 illustrates an example of the structure of a diversity receiver employing STIRC. In this example, the receiver comprises an array antenna 500 with two antenna elements 500A, 500B for signal reception. The received signal is processed in the radio frequency (RF) parts 502 of the receiver. In the RF parts the radio frequency signal is transferred to either intermediate frequency or to a base band frequency. The down converted signal is taken to A/D-converter 504, where the signal is oversampled. The samples are further processed in estimation means 506, where channel estimates are calculated, utilising methods known in the art.

From the output of the estimation means the received samples and channel estimates are taken to ST-IRC whitening means 516. The input to the whitening means comprises the received unwhitened main branch samples $z_{M1} \cdot z_{M2}$ 508, main branch channel estimates $h_{M1}$ $h_{M2}$ 510, diversity branch samples $z_{D1} \cdot z_{D2}$ 512 and diversity branch channel estimates $h_{D1}$ $h_{D2}$ 514. The output of the whitening means 516 comprises spatially and temporally whitened samples and channel estimates for the main branch $(Y_1, Y_2)_M$ 518, $(h_1, h_2)_M$ 520 and for the diversity branch $(y_1, y_2)_D$ 522, $(h_1, h_2)_D$ 524. The main and diversity branch signals are then processed independently in processing means 526, 528, where MRC-weighted minimum-phase frequency-corrected samples and channel estimates are calculated. These values 530, 532 are taken to decoding and combining means or to a trellis equalizer 534, which calculates soft bits 536, i.e. decoded bits, and an estimate of the correctness of the decoding decision.

Figure 6:
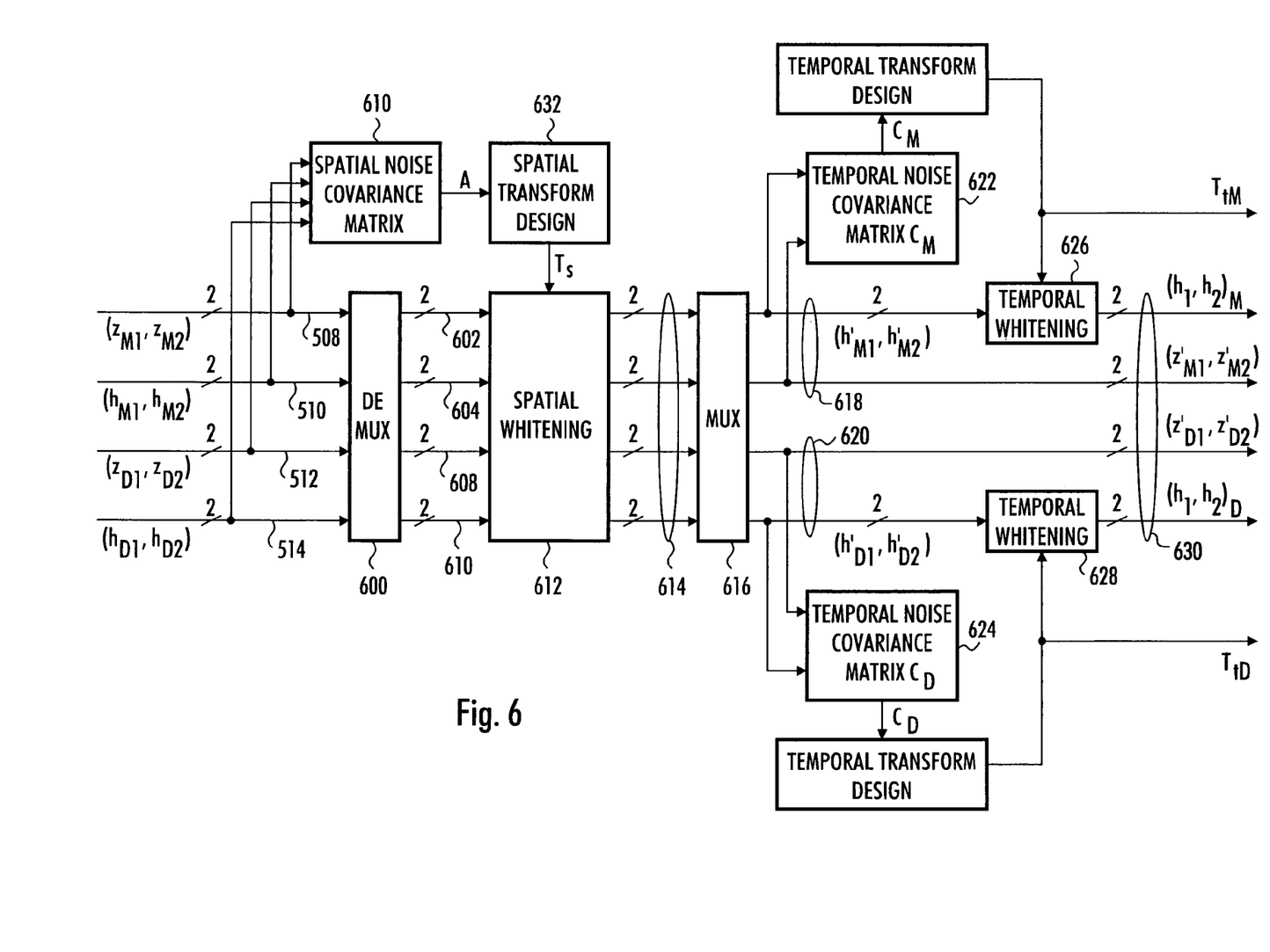
FIG. 6 illustrates an example of the structure of a diversity receiver employing IRC.

FIG. 6 illustrates an example of the structure of a diversity receiver employing IRC. The input samples are the same as in the previous figure, that is, the received unwhitened main branch samples $z_{M1} \cdot z_{M2}$ 508, main branch channel estimates $h_{M1}$ $h_{M2}$ 510, diversity branch samples $z_{D1} \cdot z_{D2}$ 512, and diversity branch channel estimates $h_{D1}$ $h_{D2}$ 514. The spatial noise covariance matrices $A_1$ and $A_2$ are computed for the input samples according to equations 3 and 4 in calculation means 610. The input samples are also demultiplexed in demultiplexer 600 to obtain samples 602-608 from the first sampling time and the second sampling time. This is followed by spatial whitening 612 of the first and second samples. The spatially whitened samples 614 are then multiplexed back in the multiplexer 616 to obtain samples for main and diversity branches 618, 620.

After the spatial whitening, the temporal noise co-variance matrices $C_M$ and $C_D$ are computed according to equations 5 and 6 in calculation means 622, 624. Note that in this implementation only the variance and co-variance terms for the diversity branch are recomputed, as only the diversity branch signal and channel taps were modified by the spatial whitening. The temporal whitening can then be done in calculation means 626, 628. At the output there are spatially and temporally whitened samples and channel estimates 630. The main and diversity branch signals are then processed independently in processing means 526, 528 similarly as in FIG. 5.

Let us study the spatial whitening process performed in means 612 in greater detail. The noise experienced on the main branch and the diversity branch is coloured. In other words, the covariance terms $cov_{ij} \neq 0$ if $i \neq j$. This is because the main branch noise and the diversity branch noise follow random processes, which are not statistically independent. To achieve statistical independence IRC decorrelates the noise on the main and diversity branches in a spatial dimension. The noise will then be white for the main and diversity branches. Effectively, IRC whitens the noise spatially.

Spatial whitening can be achieved by finding a linear transform, $T_s$, that transforms the signalling such, that the resulting noise gives a spatial noise covariance matrix, D, that has only non-zero diagonal terms. We have $$(z_{M1}, z_{D1}) \xrightarrow{T_s} (z'_{M1}, z'_{D1}) = T_s(z_{M1}, z_{D1}) \quad (11)$$

$$(z_{M2}, z_{D2}) \xrightarrow{T_s} (z'_{M2}, z'_{D1}) = T_s(z_{M2}, z_{D2})$$

$$(h_{M1}, h_{D1}) \xrightarrow{T_s} (h'_{M1}, h'_{D1}) = T_s(h_{M1}, h_{D1})$$

$$(h_{M2}, h_{D2}) \xrightarrow{T_s} (h'_{M2}, h'_{D2}) = T_s(h_{M2}, h_{D2})$$

The transform matrix, $T_s$, and the diagonilised noise matrix are computed in calculation means 632 and they are given as $$T_s = \begin{pmatrix} 1 & 0 \\ -\frac{\text{cov}_{DM}}{\sigma_M^2} & 1 \end{pmatrix} \quad (12)$$

$$D = \begin{pmatrix} \sigma_M^2 & 0 \\ 0 & \tilde{\sigma}_D^2 \end{pmatrix}, \quad (13)$$

$$\tilde{\sigma}_D \equiv \sqrt{\sigma_D^2 - \frac{\text{cov}(\sigma_M, \sigma_D)\text{cov}(\sigma_D, \sigma_M)}{\sigma_M^2}} \quad (14)$$

IRC requires the MRC step. This is carried out at the end of the branch processing 526, 528, just before the trellis equalizer 534. The noise variance is re-estimated, and the signal and channel taps are scaled with the weighted noise standard deviation for the main and diversity branch.

To avoid the matrices $A_1$ and $A_2$ becoming singular, which may happen at high SNR (especially in fixed-point implementation), a small regularization constant, $\delta$, may be added to the diagonal terms of the matrices $A_1$ and $A_2$ before the matrix inversion is performed.

Next, let us study the temporal whitening process performed in means 626 and 628 in greater detail. Temporal whitening can be achieved by finding a linear transform, $T_t$, that transforms the first and second samples of the signal and channel taps, $h_1$, $h_2$, in such a way, that the resulting noise is statistically uncorrelated. The samples belong to the same branch. In IRC temporal whitening is done for each branch. We thus have $$(z'_{M1}, z'_{M1}) \xrightarrow{T_T} (y_1, y_2)_M = T_t(z_{M1}, z_{M2}) \quad (15)$$

$$(z'_{D1}, z'_{D2}) \xrightarrow{T_T} (y_1, y_2)_D = T_t(z_{D1}, z_{D2})$$

$$(h'_{M1}, h'_{M2}) \xrightarrow{T_T} (h_1, h_2)_M = T_t(h_{M1}, h_{M2})$$

$$(h'_{D1}, h'_{D2}) \xrightarrow{T_T} (h_1, h_2)_D = T_t(h_{D2}, h_{D2}).$$

Figure 7:
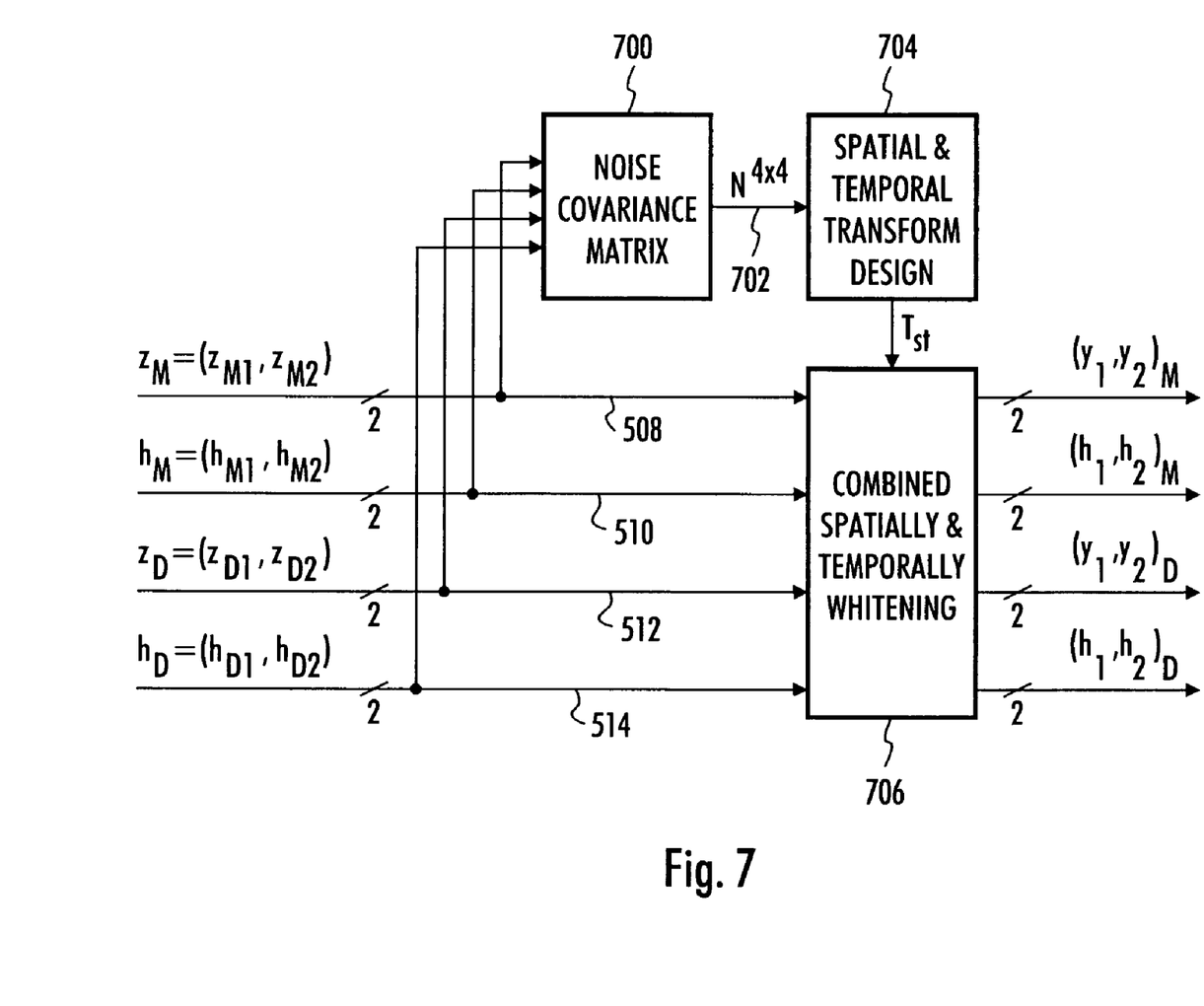
FIG. 7 illustrates an example of the structure of a diversity receiver of an embodiment employing STIRC.

FIG. 7 illustrates an example of the structure of a diversity receiver of an embodiment employing STIRC where spatial and temporal whitening are combined and conducted within the same block.

At the input there are the same samples as in the previous Figure, that is, the received unwhitened main branch samples $z_{M1}$, $z_{M2}$ 508, main branch channel estimates $h_{M1}$ $h_{M2}$ 510, diversity branch samples $z_{D1}$, $z_{D2}$ 512 and diversity branch channel estimates $h_{D1}$ $h_{D2}$ 514. The 4×4 noise covariance matrix N is computed for the input samples according to equation 7 in calculation means 700. The noise covariance matrix 702 is taken to calculation means 704, where a linear transform matrix $T_{st}$ is calculated. The transform matrix is taken to whitening means 706, where the first and second samples of the main and diversity branches for the signal $z_{M1}$, $z_{M2}$, $z_{D1}$, $z_{D2}$ and channel taps $h_{M1}$, $h_{M2}$, $h_{D1}$, $h_{D2}$ are transformed by the transform matrix $T_{st}$ in such a way that the resulting noise, $T_t$ ($e_{M1}$, $e_{M2}$, $e_{D1}$, $e_{D2}$), is statistically uncorrelated. After the linear transformation, the diagonal terms of the spatial temporal noise covariance matrix D receive only the value one, i.e. we choose by design that D equals the 4×4 identity matrix. Thus, $$(z_{M1}, z_{M1}, z_{D1}, z_{D2}) \xrightarrow{T_{st}} (y_{M1}, y_{M2}, y_{D1}, y_{D2}) = \quad (16)$$

$$T_t(z_{M1}, z_{M2} z_{D1}, z_{D2})$$

$$(h_{M1}, h_{M2}, h_{D1}, h_{D2}) \xrightarrow{T_{st}} (h_1, h_2)_M,$$

$$(h_1, h_2)_D = T_{st}(h_{M1}, h_{M2}, h_{D1}, h_{D2})$$

The transform matrix $T_{st}$ in given by the equation $$T_{st} = \begin{pmatrix} \sigma_{11} & 0 & 0 & 0 \\ \frac{\text{cov}_{12}^*}{\sigma_{11}} & \sqrt{\sigma_{22}^2 - |t_{21}|^2} & 0 & 0 \\ \frac{\text{cov}_{13}^*}{\sigma_{11}} & \frac{\text{cov}_{23}^* - t_{31}t_{21}^*}{t_{22}} & \sqrt{\sigma_{33}^2 - |t_{31}|^2 - |t_{32}|^2} & 0 \\ \frac{\text{cov}_{14}^*}{\sigma_{11}} & \frac{\text{cov}_{24}^* - t_{41}t_{21}^*}{t_{22}} & \frac{\text{cov}_{34}^* - t_{41}t_{31}^* - t_{42}t_{32}^*}{t_{33}} & \sqrt{\sigma_{44}^2 - |t_{41}|^2 - |t_{42}|^2 - |t_{43}|^2} \end{pmatrix}^{-1} \quad (17)$$

Let us return to the noise correlation matrix defined in equation 7. As already stated, $\sigma_{M1}$ represents noise variance of the respective branch and sample, and $\text{cov}_{ij}$ represents the co-variance between branches i and j. Thus, $\text{cov}_{12}$ represents co-variance between branches 1 and 2, and $\text{cov}_{34}$ represents co-variance between branches 3 and 4. The co-variances between samples of the main branch ($\text{cov}_{12}$ and $\text{cov}_{21}$) and between samples of the diversity branch ($\text{cov}_{34}$ and $\text{cov}_{43}$) are temporal co-variances needed for temporal whitening. The other covariance terms are spatial co-variances ($\text{cov}_{13}$, $\text{cov}_{31}$, $\text{cov}_{14}$, $\text{cov}_{41}$, $\text{cov}_{23}$, $\text{cov}_{32}$, $\text{cov}_{24}$, $\text{cov}_{42}$) needed for spatial whitening only when interference is involved. The amount of interference influencing the system has an effect on the values of the spatial co-variances. The values of the co-variances are negligible when the system is influenced by a small amount of interference but with large amount of additive Gaussian noise.

STIRC has a small sensitivity loss compared with MRC. In an embodiment of the invention, a sensitivity condition is estimated, and the co-variance terms are scaled down if a given threshold is exceeded. The scaling down operation gradually introduces MRC and hence reduces the influence of spatial decorrelation in a noise-limited environment. A higher scaling factor can turn off spatial decorrelation completely.

In an embodiment of the invention a decision boundary based on a threshold is formed to detect a region with severe interference. It should be noted that when the system is influenced by severe interference spatial covariance terms cannot be altered, i.e. the need for STIRC is paramount. A suitable threshold is $$\beta = \frac{var_{small}}{|c\,var_{small}|} \quad (18)$$

where $var_{small}$ represents the smallest variance obtained from matrix N. This corresponds to the energy of the interference. Similarly, $c\,var_{small}$ denotes the smallest spatial co-variance. This corresponds to the correlation of the interference in relation to the samples. By using simulation to examine all channel condition and coding schemes, it can be estimated that the optimum threshold value that separating a region of severe interference is 2. This can be readily verified from FIGS. 8A to 8F, in which the Probability Density Function (PDF) is plotted against thresholds for various channel conditions. The figures show the occurrences in a given channel against the thresholds when given channel is simulated using various interference and noise levels.

Figure 8A:
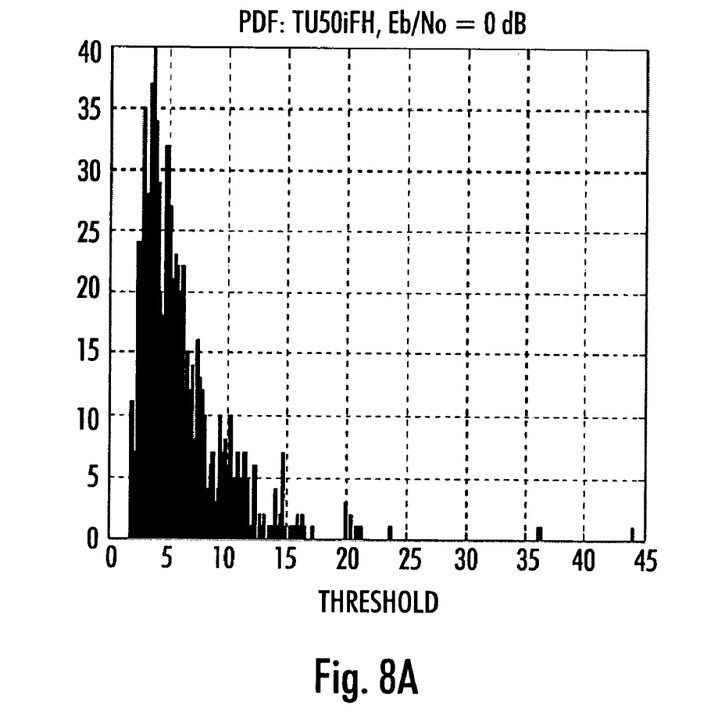
FIGS. 8A to 8F illustrate simulation results, where a Probability Density Function is plotted against thresholds of various channel conditions.
Figure 8B:
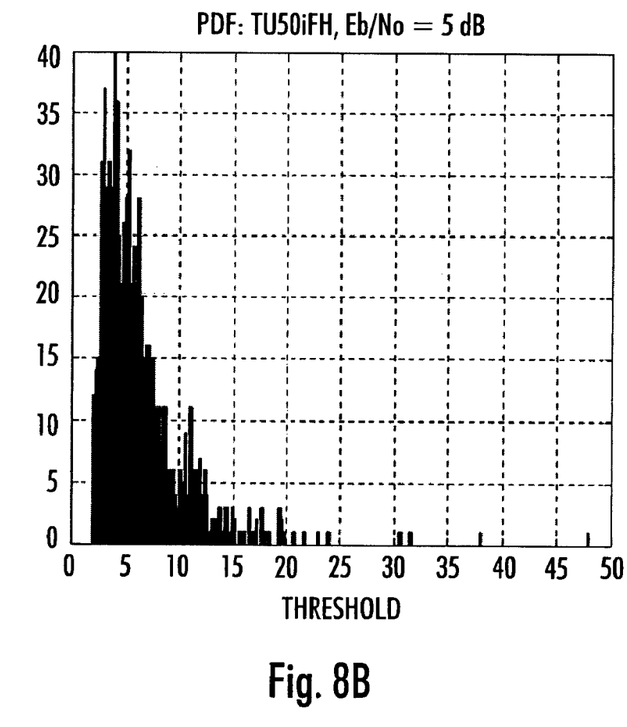
Figure 8C:
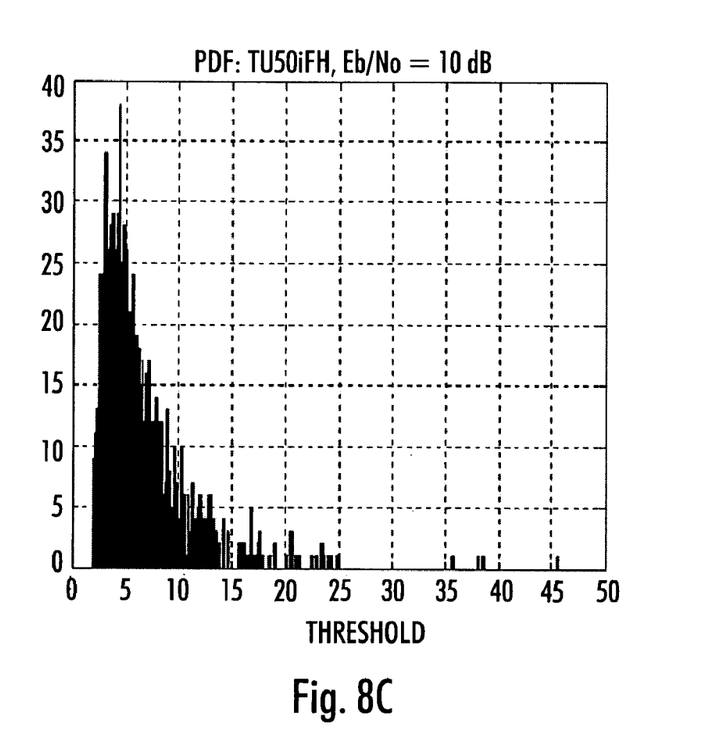
Figure 8D:
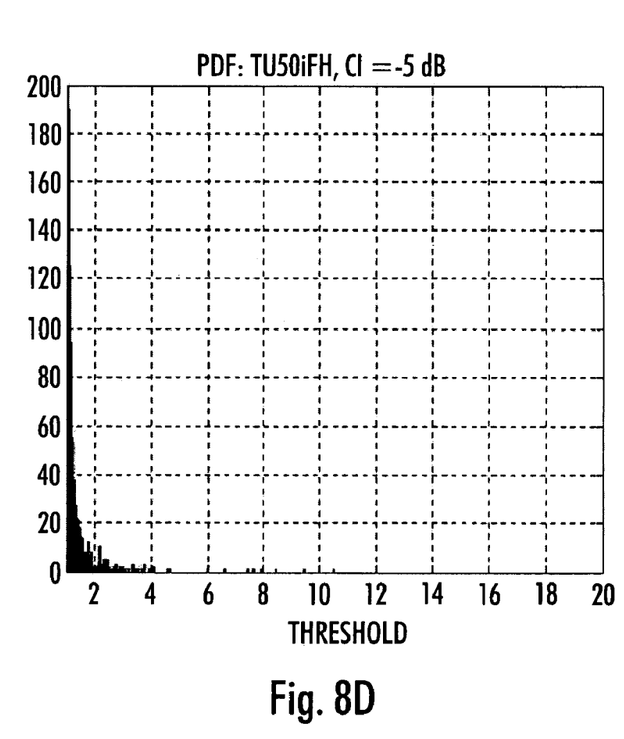
Figure 8E:
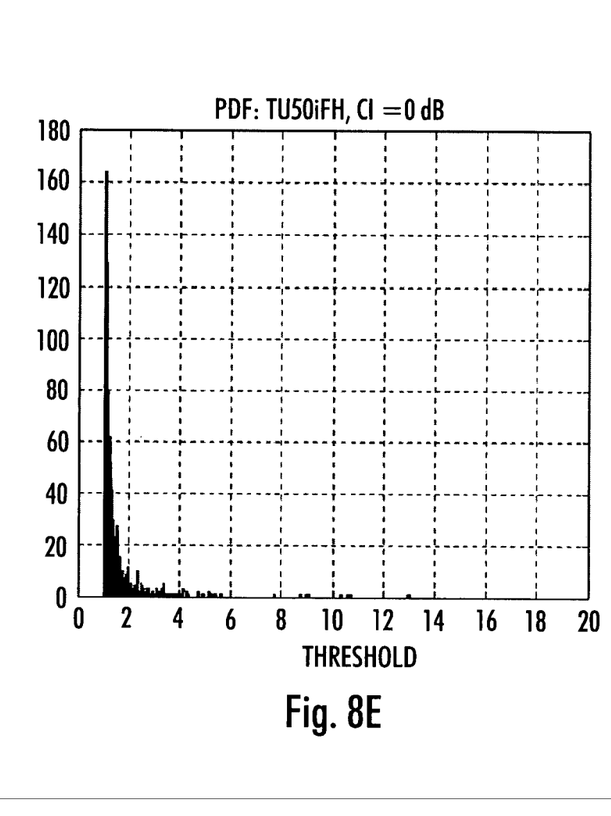
Figure 8F:
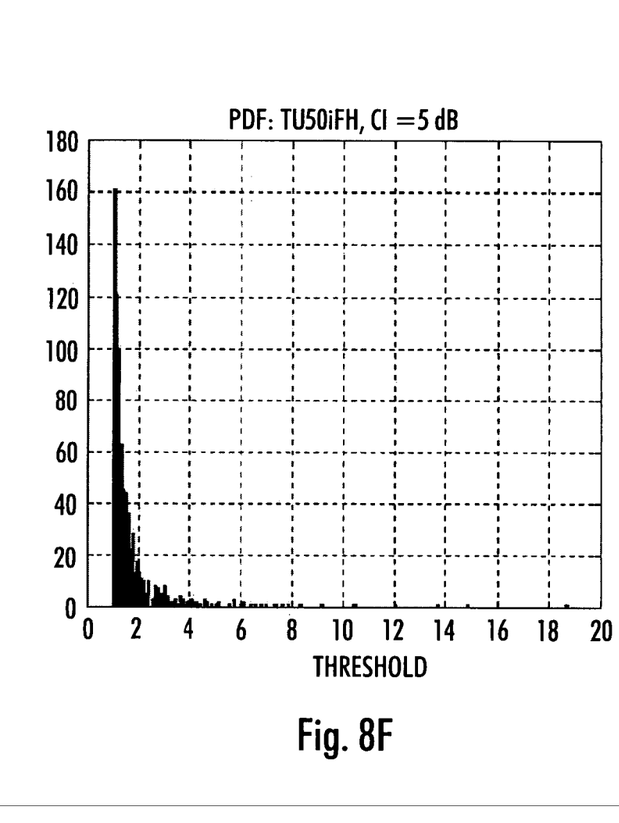

FIGS. 8A to 8F show how the threshold values are distributed when TU50iFH (Typical Urban, mobile velocity 50 km/h, ideal frequency hopping) at 1800 MHz channel condition is simulated using various interference and noise levels. The x-axis represents the threshold value bins and the y-axis represents the total number of occurrences detected within those bins. FIGS. 8A to 8C illustrate the PDFs obtained for 3 different Eb/No values, while FIGS. 8D to 8F show the PDFs for 3 different co-channel interference levels. For example, FIG. 8A shows the threshold distributions for a simulated TU50iFH 1800 MHz where Eb/No=0 dB. The threshold values of a large number of bursts that meet this particular condition are colleted and the numbers of occurrences are plotted against the various threshold bins.

From the PDFs shown in FIGS. 8A to 8F it can be determined that threshold boundary value 2 can be used to separate the interference-limited environment perfectly. In an embodiment of the invention, STIRC is always used when the measured ratio β in equation 18 is smaller than the predetermined threshold. Thus, it helps to obtain interference gain via spatial decorrelation. When the ratio β defined by the equation 18 exceeds the predetermined threshold (i.e. β>2), a scaling factor α is calculated as $$\alpha = e^\beta \quad (19)$$

and the spatial co-variances are scaled down according to equation $$cov'_{ij} = \frac{cov'_{ij}}{\alpha}. \quad (20)$$

Thus the influence of spatial decorrelation is reduced exponentially as the amount of interference decreases. The exponent scaling is preferred, as the spatial covariance values vary significantly in severely noise-limited environments. The new spatial co-variances are then used to obtain a transform matrix for a spatial whitening process.

In another embodiment also a linear scaling can be used, such as $$\alpha = A*\beta, \quad (21)$$

where A represents a scale value (e.g. 10). However, it may provide slightly poorer performance in areas where the received signal is mainly dominated by AWGN (Average White Gaussian Noise).

Figure 9:
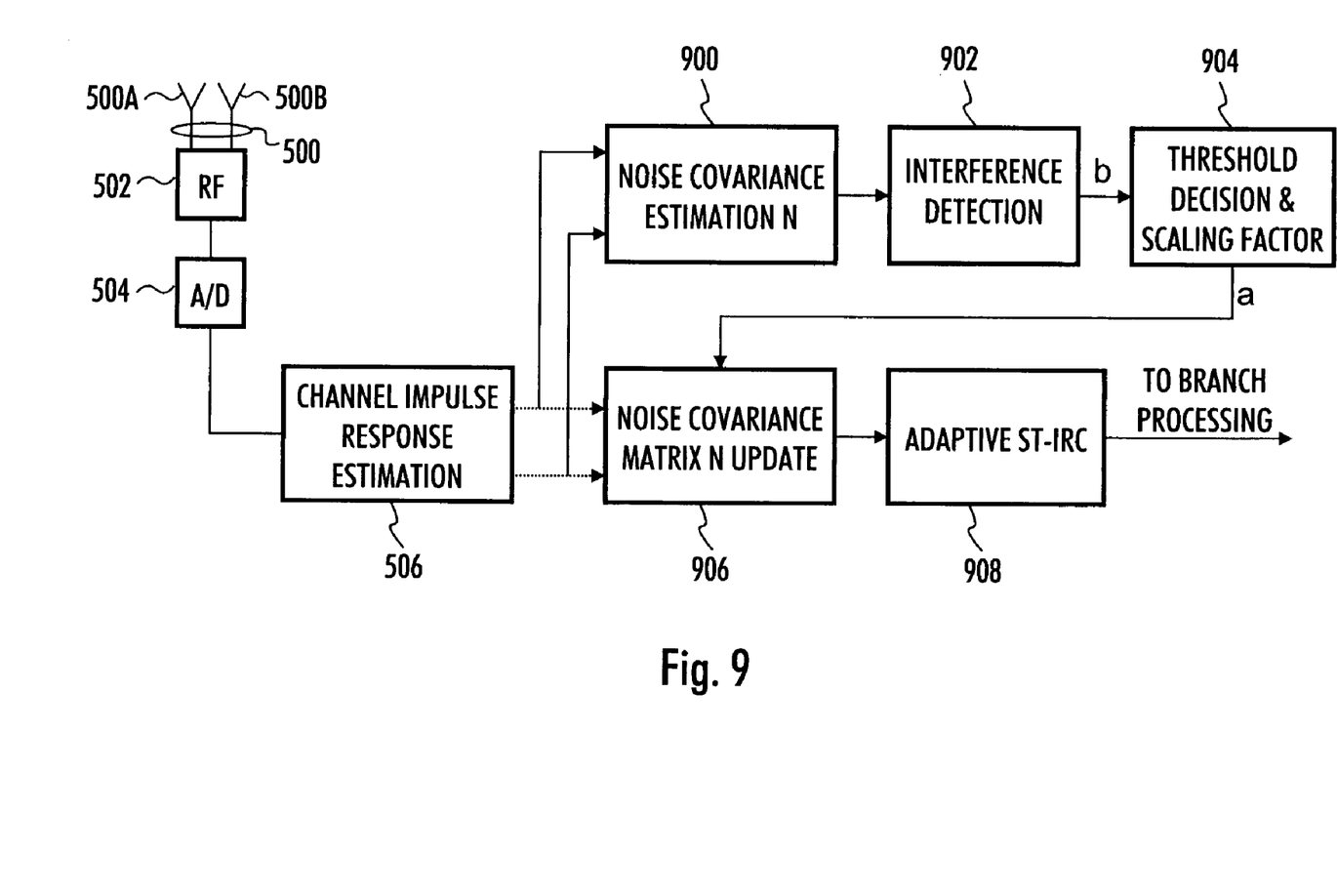
FIG. 9 illustrates the use of a scaling factor.

FIG. 9 illustrates the use of the scaling factor. In this example, the receiver of FIG. 9 comprises an array antenna 500 with two antenna elements 500A, 500B for signal reception. The received signal is processed in the RF parts 502 of the receiver. In the RF parts the radio frequency signal is transferred either to intermediate frequency or to a base band frequency. The down converted signal is taken to A/D-converter 504, where the signal is oversampled. The samples are further processed in estimation means 506 where channel estimates are calculated utilising methods known in the art.

The sampled signals together with the channel estimation are taken to calculation means 900 where the noise co-variance matrix N defined in equation 7 is calculated. The matrix N and the samples are taken to interference detection means 902 where a threshold D is calculated according to equation 18. Next, in means 904, the calculated threshold is compared with a given predetermined value, and a scaling factor α is calculated according to equation 19. The factor α is then taken to noise co-variance matrix update 906, where a new matrix N is calculated according to equation 20, and finally to adaptive space-time interference rejection means 908, after which the signal is taken to branch processing (not displayed).

The different calculation means 902-908 of FIG. 9 can be implemented by means of one or more processors programmed by appropriate software, or in the form of hardware components, such as integrated circuits, discrete components, or a combination of any of these, which are evident for one skilled in the art.

Even though the invention is described above with reference to an example according to the accompanying drawings, it is clear that the invention is not restricted thereto but it can be modified in several ways within the scope of the appended claims.

The invention claimed is:

1. A receiving method in a receiver of a radio system, comprising:
   receiving a signal with an array antenna comprising at least two antenna elements,
   oversampling the received signal,
   measuring the spatial and temporal color of the received oversampled signal,
   combining the received signal using combined maximum ratio combining and space-time interference rejection combining,
   controlling the combining of the received signal on the basis of the measurement results.

2. The method of claim 1, further comprising:
   calculating the energy of interference;
   calculating the cross-correlation of noise between samples of the received signals, calculating a threshold value as a quotient of the above values, controlling the combining on the basis of the threshold value.

3. The method of claim 2, further comprising:

calculating at least one scaling factor as a function of the threshold value, and controlling the combining on the basis of the scaling factor.

4. The method of claim 3, further comprising:

calculating the scaling factor according to formula $e^\beta$, where e is an exponential function and $\beta$ is the threshold value.

5. The method of claim 3, further comprising:

calculating the scaling factor according to formula $A\beta$, where $\beta$ is the threshold value and A is a predetermined constant.

6. The method of claim 1, further comprising:

calculating a noise covariance matrix comprising noise variance terms, temporal covariance terms and spatial covariance terms, and scaling the spatial covariance terms on the basis of the measurement result.

7. The method of claim 3, further comprising:

scaling the spatial covariance terms using the scaling factor.

8. The method of claim 3, further comprising:

comparing the calculated threshold value with a predetermined value, and if the threshold value exceeds the given pre-determined value, the combining of the received signal is controlled on the basis of the scaling factor.

9. The method of claim 3, further comprising:

calculating a scaling factor for each antenna element pair separately.

10. A receiver, comprising:

an antenna array means comprising at least two antenna elements, for receiving at least one signal;

an oversampling means for oversampling the received signal;

a measuring means for measuring the spatial and temporal color of the samples;

a combining means for combining the received signal using combined maximum ratio combining and space-time interference rejection combining; and a controlling means for controlling the combining of the received signal based on the measurement result.

11. The receiver of claim 10, further comprising:

a first calculating means for calculating the energy of noise;

a second calculating means for calculating the cross-correlation of noise between samples of the received signals, a third calculating means for calculating a threshold value as a quotient of the above values, wherein the controlling means is further configured for controlling the combining based on the threshold value.

12. The receiver of claim 11, wherein the controlling means is further configured for calculating at least one scaling factor as a function of the threshold value, and controlling the combining based on the scaling factor.

13. The receiver of claim 10, further comprising wherein the controlling means is further configured for calculating the scaling factor according to formula $e^\beta$, where e is an error vector and $\beta$ is the threshold value.

14. The receiver of claim 12, further comprising a fourth calculating means for calculating a noise covariance matrix comprising noise variance terms, temporal covariance terms and spatial covariance terms, and a scaling means for scaling the spatial covariance terms using the scaling factor.

15. The receiver of claim 12, further comprising a comparing means for comparing the calculated threshold value with a pre-determined value, and making the decision of the use of the scaling factor on the basis of the comparison.

16. A receiver comprising:

an antenna array for signal reception, the array antenna comprising at least two antenna elements;

an analog to digital converter configured to oversample the received signal;

a measuring unit configured to measure the spatial and temporal color of the samples a combining unit configured to combine the received signal using combined maximum ratio combining and space-time interference rejection combining, and a control unit configured to control the combining of the received signal based on the measurement result.

17. The receiver of claim 16, further comprising:

a first calculator unit configured to calculate the energy of noise;

a second calculator unit configured to calculate the cross-correlation of noise between samples of the received signals, a third calculator unit configured to calculate a threshold value as a quotient of the above values, wherein the combining unit is further configured to control the combining based on the threshold value.

18. The receiver of claim 17, wherein the combining unit is further configured to calculate at least one scaling factor as a function of the threshold value, and to control the combining based on the scaling factor.

19. The receiver of claim 16, wherein the combining unit is further configured to calculate the scaling factor according to formula $e^\beta$, where e is an error vector and $\beta$ is the threshold value.

20. The receiver of claim 18, further comprising:

a noise covariance matrix comprising noise variance terms, temporal covariance terms and spatial covariance terms; and a scaling unit configured to scale the spatial covariance terms using the scaling factor.

21. The receiver of claim 18, further comprising:

a comparing unit configured to compare the calculated threshold value with a pre-determined value, and to make the decision of the use of the scaling factor based on the comparison.

* * * * *